US008886997B2

(12) United States Patent
Boisde et al.

(10) Patent No.: US 8,886,997 B2
(45) Date of Patent: Nov. 11, 2014

(54) HARDWARE SECURITY MODULE AND PROCESSING METHOD IN SUCH A MODULE WITH AUGMENTED COMMUNICATION FEATURES

(75) Inventors: Matthieu Boisde, Leognan (FR); Nicolas Bousquet, Pessac (FR)

(73) Assignee: Oberthur Technologies, Colombes (FR)

( * ) Notice: Subject to any disclaimer, the term of this patent is extended or adjusted under 35 U.S.C. 154(b) by 363 days.

(21) Appl. No.: 13/328,243

(22) Filed: Dec. 16, 2011

(65) Prior Publication Data
US 2012/0159253 A1   Jun. 21, 2012

(30) Foreign Application Priority Data

Dec. 17, 2010 (FR) ...................................... 10 60725

(51) Int. Cl.
*G06F 11/00* (2006.01)
*G06F 11/36* (2006.01)

(52) U.S. Cl.
CPC ........ G06F 11/3656 (2013.01); G06F 11/3636 (2013.01)
USPC .......................................................... 714/30

(58) Field of Classification Search
CPC .............. G06F 9/5011; G06F 11/3636; G06F 11/3648; G06F 11/3656; G06F 12/0607; G06F 1/12; G06F 13/28
USPC .................................................... 714/30–32
See application file for complete search history.

(56) References Cited

U.S. PATENT DOCUMENTS

| 5,896,536 | A | 4/1999 | Lindsey |  |
|---|---|---|---|---|
| 7,206,982 | B1 * | 4/2007 | Patel et al. | 714/724 |
| 7,216,257 | B2 * | 5/2007 | Kilian | 714/31 |
| 7,861,119 | B1 * | 12/2010 | Righi et al. | 714/38.1 |
| 2002/0099953 | A1 | 7/2002 | Deindl et al. |  |
| 2008/0072103 | A1 * | 3/2008 | Lou | 714/38 |
| 2009/0082008 | A1 * | 3/2009 | Thorell | 455/423 |

FOREIGN PATENT DOCUMENTS

| WO | 00/68797 | 11/2000 |
|---|---|---|
| WO | 2005/076139 | 8/2005 |

OTHER PUBLICATIONS

French Search Report dated Sep. 27, 2011, corresponding to Foreign Priority Application No. 1060725.
"Arm Security Technology: Building a Secure System Using TrustZone Technology" Apr. 30, 2009, pp. I-Glossary-4.
"CoreSight ETM11 Revision: r1p1 Technical Reference Manual"; May 17, 2007; pp. I-Glossary-10.

* cited by examiner

*Primary Examiner* — Bryce Bonzo
*Assistant Examiner* — Elmira Mehrmanesh
(74) *Attorney, Agent, or Firm* — Young & Thompson

(57) ABSTRACT

The present invention relates to the field of processing within hardware security modules, such as for example debugging of compiled programs. A debugging module includes a microprocessor and a compiled program to be executed by the microprocessor in order to carry out an operation, and is configured to exchange with an external entity, in a master/slave mode, messages relating to the operation. The compiled program includes at least one debugging instruction which whether or not it is executed does not modify the execution of the operation. The hardware security module is moreover configured to transmit, during the execution of the compiled program, data generated, for example by the debugging instruction, over a communication channel initiated by the hardware security module, to an entity external to the hardware security module.

13 Claims, 6 Drawing Sheets

```
1   void inspectedFunction(void) {
2       // local variables
3       int var_a, var_b, var_c;
4
5       // function begin
6       UDEBUGF("Processing method inspectedFunction\n");        ←——— ID1
7
8       // local vars initialization
9       ...
10
11      if (function_a() == SUCCESS) {
12          UDEBUGF("Call to function_a() succeeded");           ←——— ID2
13
14          // some processing
15          ...
16      }
17      else {
18          // function_a() failed
19          UDEBUGF("Call to function_a() failed");              ←——— ID3
20
21          // some processing
22          ...
23
24          if (function_b(var_a, var_b, var_c) != SUCCESS) {
25              // Error Case
26
27              // report on error
28  UDEBUGF("Unexpected error during call to function_b()");     ←——— ID4
29  UDEBUGF("Function Parameters : %i, %i, %i", var_a, var_b, var_c);
30                                                                     ID5
31              // error processing
32              throw (Exception);
33              ...
34          }
35      }
36
37      // some processing
38      ...
39
40      // function end
41      UDEBUGF("Leaving method inspectedFunction\n");           ←——— ID6
42  }
```

```
1   UDEBUGF function(parameters)
2   if(B_enable) {
3           [... Debugging processing ...]
4   }
5   else return
```

Figure 3

HARDWARE SECURITY MODULE AND PROCESSING METHOD IN SUCH A MODULE WITH AUGMENTED COMMUNICATION FEATURES

This Patent Application claims the priority of French Patent Application No. 1060725 of 17 Dec. 2010, which is incorporated herein by reference.

FIELD OF THE INVENTION

The present invention relates to the field of processing within hardware security modules (HSMs) for the purpose of transmitting data to entities external to the modules.

The invention relates more particularly to a processing method and a hardware security module implementing such processing. This can involve for example processing of the "debugging" type used for debugging computer programs or applications in the closed environments of such hardware security modules, or processing of the type used for accessing data stored in these modules.

CONTEXT OF THE INVENTION

A hardware security module can be in the form of a microprocessor card or "chip card" (also known by the term "smart card", for example a card provided with a security module such as a SIM card), a secure USB key with a microprocessor, a security module of a biometric passport, etc.

A computer program groups together a set of instructions which when concatenated on execution allow the performance of an operation or a set of operations desired by the programmer.

Hardware security modules can execute such a program on receiving a corresponding command originating from an external entity. Hereinafter, the concept of "external" relates to whether or not an element belongs to the hardware security module (HSM) in question.

Hardware security modules, typically microprocessor cards, form part of a master-slave relationship (similar to a client/server mode), in which the external entity sends commands that the HSM executes. This execution can drive that of programs it contains, and provides generated data in response once the execution is finished.

By way of example, these master-slave exchanges can be based on the ISO 7816 protocol or the ISO 14443 protocol.

Such protocols managing the master-slave exchanges can nevertheless have drawbacks, such as for example limiting the maximum size of the data returned by the HSM in response to a prior command. Thus, when a large file is decrypted in the HSM, its transmission can come up against the limitations of the protocol used and be truncated or cancelled.

Moreover, the physical links supporting these protocols can also have bitrate restrictions which prevent the HSM from communicating, for example in "real-time" or rapidly, a large amount of data such as the whole of the large decrypted file mentioned previously.

There is therefore a need to improve the processing mechanisms used by hardware security modules in a context of transmitting data to an external entity.

Such a difficulty also exists in the context of the debugging of a computer program such as mentioned previously.

In a manner known per se, the debugging of a computer program concerns the activity and procedures consisting of detecting, diagnosing and correcting bugs, i.e. the causes of program malfunctions.

The causes of malfunctions can result from programming errors, but also from incompatibilities or poor management between the program code and the hardware resources available during the execution of the program.

Conventionally, computer programs or software are written in a programming language (source code), debugged from the source code, then compiled, all within an "Integrated Development Environment" (IDE) grouping together the set of software development tools. Development environments are, for reasons of cost, usually executed on personal computers (PCs).

Thus, a programmer can test a developed program by executing it step by step from its source code (called "line-by-line" debugging), i.e. instruction after instruction, or by inserting additional instructions therein, called debugging instructions, the execution of which does not change the performance of the program operation or operations.

The debugging instructions can for example print, log or simply display the current values of internal variables of the program, such as the values stored in the "runtime stack".

When the debugging procedure is terminated, the debugging instructions are deleted from the source code and the latter is compiled in order to obtain an executable compiled program, i.e. a production version of the program. It is then loaded into the memory of the hardware platform in which it is intended to be executed, this platform providing it with a runtime environment, illustrated for example by the operating system that it comprises.

The compiled program can for example be loaded into the ROM or EEPROM ("Electrically-Erasable Programmable Read-Only Memory") memory of a hardware security module.

Hardware security modules however have particular hardware and/or software characteristics (for example in relation to the operating system) compared with the personal computers in which the development environments are implemented, in particular in that they have limited system resources and are designed to reveal a minimum of information on their internal operation.

It is thus standard procedure to use hardware security module emulators, within a development environment on a PC, and to execute these emulators to reproduce, as faithfully as possible, a runtime environment of the hardware security module.

It may be the case, however, that a compiled program is not satisfactory and requires debugging again, for example because not all situations had been tested during previous debugs. In this case, it is usual to retrieve the corresponding source code and re-test it in the development environment.

This approach proves satisfactory when the development environment is substantially similar to the runtime environment of the program, once the latter has been compiled. In this case, malfunctions observed using the compiled program can be reproduced in the development environment and can then be corrected.

However, this is not always the case for hardware security modules, owing to the discrepancies mentioned previously and also because these modules can be personalized by a client (for example a bank) or have hardware components producing unexpected faults linked to their individual characteristics. In this case it is difficult to envisage adjusting the emulators, or even impossible when the individual characteristics specific to each HSM are taken into account.

These discrepancies are moreover difficult to determine and observe, owing to the closed nature of the hardware security modules resulting for example from security protection measures that they use in order to reveal a minimum of their internal operation.

Thus, the hardware security module emulators used for the program development are generally based on an imperfect modelling of the runtime environment of the HSM.

As a result, some malfunctions observed during the execution of the compiled program in a hardware security module cannot be reproduced by the corresponding source code when the latter is executed in the development environment, despite the use of emulators.

This difficulty existing in the case of hardware security modules consequently gives rise to additional, sometimes uncontrolled, costs for debugging a computer program and providing a "clean" compiled version.

In an embodiment of the present invention, the latter aims to provide an improvement to the systems and methods of the state of the art for debugging purposes.

However, implementing debugging means also introduces difficulties relating to transmitting the (debugging) data generated. This transmission must, as far as possible, not modify the runtime environment or context of the compiled program, in order to obtain debugging data that are as accurate as possible.

In these different contexts the present invention aims to provide an improvement to processing in HSMs, for the purposes of transmitting locally generated data to an external entity.

SUMMARY OF THE INVENTION

In this context, the invention relates in particular to a hardware security module comprising a microprocessor and a program to be executed by said microprocessor in order to carry out an operation, the hardware security module being configured to receive and transmit, according to a master-slave mode of communication with an external master entity, at least respectively one command to carry out the operation and one corresponding response, characterized in that it is further configured for:
    generating data in response to receipt of the command,
    transmitting said generated data to an external entity over a communication channel initiated by it.

The invention thus makes it possible to substantially improve the processing performed in a hardware security module. This results from the implementation of the communication channel at the initiative of the HSM, to convey the data the generation of which is initiated by the receipt of the command.

It will be noted that the initiation of a communication channel by the HSM adopts the opposite position to the conventional techniques in which the HSM is "seen" as a slave of the external master entity.

In order to illustrate this improvement by means of the invention, in the case of access to an encrypted file mentioned previously, the approach according to the present invention makes it possible to overcome the protocol limitations of ISO 7816, for example when the generated data to be transmitted are too large to be transmitted in real time or rapidly.

In the case of the debugging, use of this communication channel initiated by the HSM to transmit debugging data makes it possible to keep the master-slave relationship unchanged (it is not necessary to provide specific commands for retrieving these debugging data), and therefore to perform a possible debugging in optimum conditions (corresponding to the exact production conditions). It makes it possible moreover to restore these debugging data in real time or almost in real time.

In an embodiment of the invention, the master-slave exchanges and the generated data are transmitted over two different physical links to outside the hardware security module. This can be for example two different electrical contacts among the eight contacts of the physical interface of a microprocessor card conforming to standard ISO 7816.

In a variant, the master-slave exchanges and the generated data can be transmitted over a single physical link. For example, multiplexing these exchanges and generated data over the same physical link can be implemented so that the generated data can be transmitted (almost) in real time: multiplexing APDU commands/responses and the generated data (for example debugging data) over a USB link.

According to an embodiment of the invention relating to the debugging:
    the program is a compiled program comprising at least one debugging instruction which whether or not it is executed does not modify the execution of said operation, and
    the hardware security module is configured to transmit, during the execution of the compiled program, the generated data, called debugging data, resulting from the execution of the debugging instruction, over said communication channel initiated by the hardware security module.

The external entity provided at the end of the communication channel can thus make use of the results of the debugging instructions, also called debugging information, to identify a malfunction. Conventionally, this can be a simple display of these results (corresponding for example to values of internal variables) to a user so that the latter can use them to discover the malfunction.

This embodiment allows real-time debugging to be performed in the exact runtime conditions of the debugging program.

This is because, on the one hand, the compiled program is tested. This is made possible by the integration of the debugging instructions within this compiled program itself.

On the other hand, the transmission over two different communication channels (logic as well as physical, one being the channel for the master-slave exchanges [for example APDU ("application protocol data unit") exchanges] and the other the channel initiated by the HSM itself) of the data relating to the operation and debugging information makes it possible to keep the master-slave relationship unchanged, which corresponds to the exact production conditions.

According to a particular feature, the at least one debugging instruction implements a command to write generated debugging data over a UDP socket created by the hardware security module, optionally by calling a routine or subfunction. Management of debugging information according to this configuration makes it possible to avoid overstressing other programs of the HSM (such as the operating system), to keep a runtime environment in accordance with a production environment.

In an embodiment, the hardware security module comprises a means of inhibiting or activating the debugging instruction during the execution of the compiled program. Inhibition of the debugging instruction consists in the latter not being executed during the execution of the compiled program, contrary to its activation. The inhibition or activation can be implemented in the code of the compiled program in the form of a conditional instruction based on an item of inhibition information.

This arrangement makes it possible to improve the runtime performance of the compiled program when in operation, by avoiding the processing time associated with the debugging instructions that are no longer required.

In particular, the inhibition or activation means can be modified in response to a command received from the external master entity.

This arrangement allows external control of the moments when the debugging takes place. In particular, as the debugging is more effective if it takes place within the framework of predefined tests (i.e. by executing an external test script which will launch and drive the execution of the compiled program), the inhibition or activation can be closely linked to the test script, via for example integration within this external script of an activation command (at the start of the script) and an inhibition command (at the end of the script).

According to a particular feature, the inhibition or activation means is protected from modification by a cryptographic security mechanism. In the context where on the one hand the hardware security module is designed to reveal a minimum of its internal operation and on the other hand the debugging instructions aim to show a portion of the latter, this arrangement makes it possible to ensure a reasonable level of security to avoid revealing information on this internal operation without authorization.

According to another particular feature, said inhibition or activation means comprises an item of information stored in a one-time programmable memory so that inhibition of the debugging instruction is definitive. Thus, generally the information initially adopts a value corresponding to an activation state (therefore initially allowing debugging to be carried out) then, owing to the nature of the memory, finally adopts an inhibition value as soon as the debugging tests are finished.

This arrangement offers a higher security level insofar as, immediately on inhibition, the hardware security module definitively returns to its first configuration, namely showing a minimum of its internal operation.

Furthermore it will be noted that this information can be used in the conditional instructions mentioned previously to authorize execution of a debugging instruction or not.

According to another embodiment of the invention relating to access to data stored in the HSM, the command received from the external master entity is an access command to an encrypted file stored in the memory of said hardware security module, and the generated data transmitted over the communication channel initiated by the hardware security module are decrypted data of said file.

Thus, the generated data are not transmitted in an (APDU type) response taking place within the master-slave exchanges.

As mentioned previously, this arrangement makes it possible to overcome certain limitations of protocols such as ISO 7816, for transmitting data from a smart card to an external reader.

In an embodiment, the hardware security module is configured to create a UDP ("User Datagram Protocol") socket for communicating data over a communication link with the external entity and for transmitting the generated data via said UDP socket.

In this configuration, the transmission of the generated data (for example debugging information) is easily initiated by the HSM. It should be pointed out that the UDP mode is a connectionless mode.

Within the framework of the debugging, the absence of prior establishment and management of a connection makes it possible to concentrate the processing of the HSM on only the execution of the compiled program. Thus, the use of a UDP socket rather than a socket in connected mode (which would be possible) makes it possible to obtain a runtime environment in accordance with a production environment, that is not modified in any way by additional processing.

In particular, the communication link with the external entity implements a USB ("Universal Serial Bus") type physical layer protocol. Such a protocol has the advantage of easily allowing multiplexing of the master-slave communication channel and the communication channel over UDP socket.

This makes it possible for example to implement these two channels simultaneously over a single physical link with the external entity.

In variant embodiments however, the communication link with the external entity can implement a physical layer protocol of the Bluetooth™ type or ISO 7816 or ISO 14443 or NFC type.

According to a feature of the invention, the hardware security module can be configured to encrypt the debugging data transmitted over the communication channel that it initiates, making it possible to secure the debugging operations vis-à-vis the internal operation of the security module which must remain undisclosed as far as possible.

Correlatively, the invention also relates to a processing method in a hardware security module comprising a microprocessor and a program to be executed by said microprocessor in order to carry out an operation, the hardware security module being configured to receive and transmit, according to a master-slave mode of communication with an external master entity, at least respectively a command to carry out the operation and a corresponding response, characterized in that it comprises the following steps:

in response to receipt of the command, generating data at the hardware security module, transmitting said generated data to an external entity, over a communication channel initiated by the hardware security module.

The processing method has advantages similar to those of the HSM disclosed above. For example within the framework of debugging operations, it makes it possible to carry out real-time debugging operations on compiled programs in their own runtime environment called the "production runtime environment", without going through imperfect emulators. Within the framework of data access operations, it allows possible data volume restrictions introduced by master-slave communication protocols to be overcome.

Optionally, the procedure can comprise steps and features with respect to the means and features of the HSM.

In particular, it can be provided for the master-slave exchanges to relate to carrying out said operation with the external master entity, for the program to be a compiled program comprising at least one debugging instruction which whether or not it is executed does not modify the execution of said operation, for the process to comprise the transmission, during the execution of the compiled program, of generated data, called debugging data, resulting from the execution of the debugging instruction over said communication channel initiated by the hardware security module.

According to another feature, a step of inhibition or activation of the debugging instruction can be provided prior to the execution of the compiled program, according to a command issued by the external master entity.

According to a particular aspect providing access security for the internal data of the HSM card via access to the results of the debugging instructions an authentication step can be provided to allow an inhibition or activation state of the debugging instruction to be changed in response to the command issued at the external master entity.

Finally, in order to prevent this access definitively, for example at the end of debugging operations, provision can be made for the inhibition or activation state to be stored in a one-time programmable memory of the hardware security module, so that inhibition of the debugging instruction is definitive.

According to a particular feature, the method comprises a step of executing a test script on a external entity to drive the execution of the compiled program via the master-slave exchanges.

In an embodiment of the invention, a command received from the external master entity is an access command to an encrypted file, and the generated data transmitted over the communication channel initiated by the hardware security module are decrypted data of said file.

In an embodiment of the invention, provision can be made to create a UDP socket at the hardware security module for communicating data over a communication link with the external entity and transmitting the generated data over said UDP socket.

A further purpose of the present invention relates to a mobile phone comprising a contactless communication interface and a hardware security module such as described above and comprising a first electrical contact linked to said contactless communication interface, mobile phone wherein the communication channel with the external master entity (i.e. for the master-slave communication for receiving and transmitting at least the command to perform the operation and the corresponding response) and the communication channel initiated by the hardware security module with the other external entity are, for one of them, compliant with a contactless communication standard via the first electrical contact and, for the other one, compliant with a contact communication standard via a second electrical contact of the hardware security module.

As will become apparent from the description below, the contactless communication interface with which the mobile phone is equipped can be of the NFC type, the hardware module communicating with this interface via the SWP protocol. With respect to the contact communication, any conventional standard for microprocessor cards can be used, for example standard ISO 7815 supported by contact C7 of contact smart cards.

BRIEF DESCRIPTION OF THE FIGURES

Other features and advantages of the invention will become apparent in the following description, illustrated by the attached drawings, in which:

FIG. 3 shows a simplified example of a compiled program (in its source version) including debugging instructions according to an embodiment of the invention;

DETAILED DESCRIPTION OF EMBODIMENTS OF THE INVENTION

Figure 1:
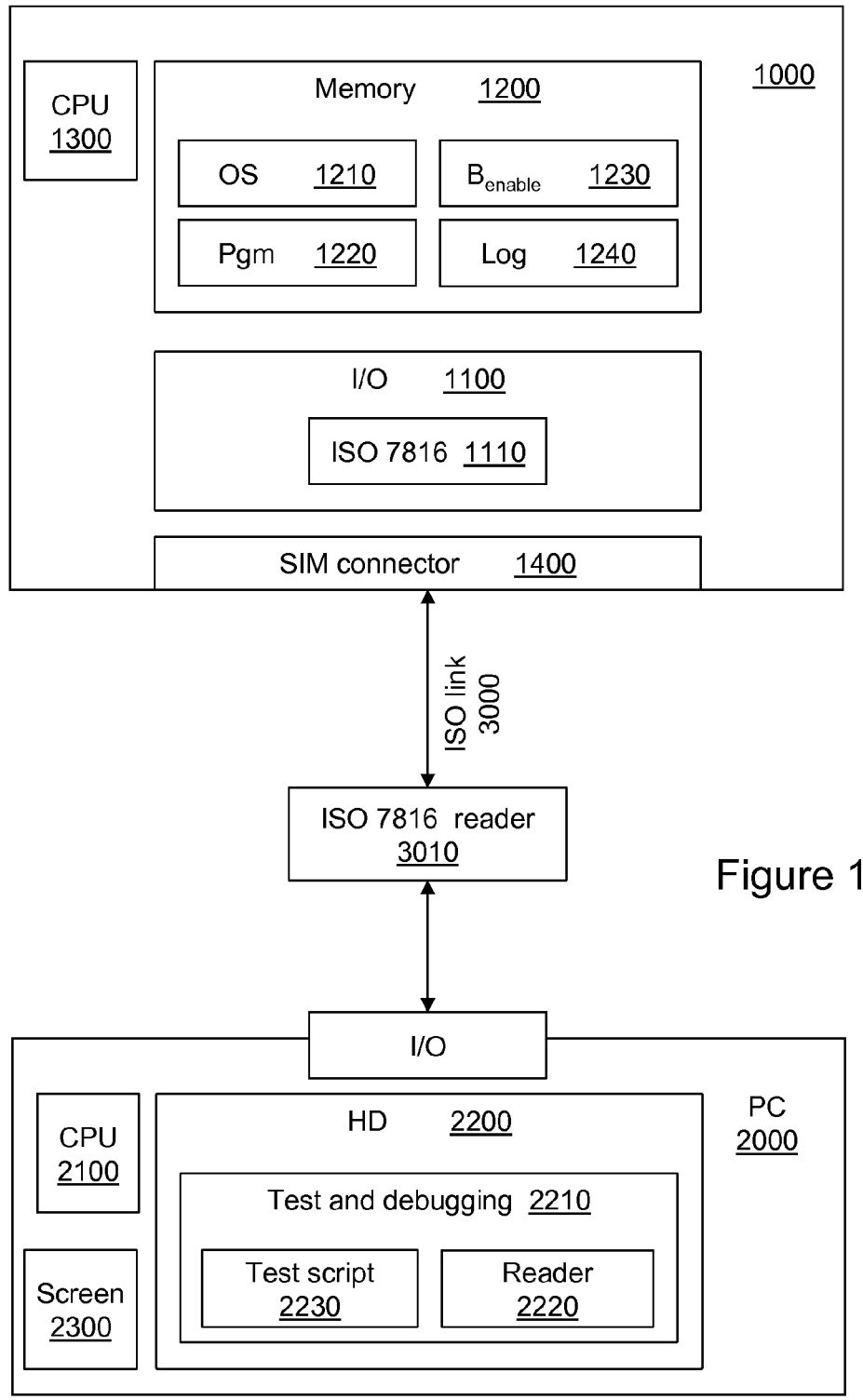
FIG. 1 shows a debugging system in "deferred" mode, using a conventional ISO 7816 connection.

The present invention can be applied to any type of hardware security module. For the purposes of illustration only, reference is made hereinafter to a microprocessor card (or "smart card"). A hardware module is called a "security" hardware module for example if it conforms to a standard relating to security, for example if it conforms to the common criteria and/or the standard "FIPS 140" ("Federal Information Processing Standard").

Firstly, a description is given of the implementation of the invention in a debugging context.

Microprocessor cards include compiled programs that they can execute at the command of an external entity. As described hereinafter, embodiment examples of the invention implement in a microprocessor card such a compiled program in which debugging instructions have been kept, in addition to the instructions intended to perform the primary operation or function of said program.

The debugging instructions are executed during a test phase. Thus a master program or test script is generally designed to drive the execution of the compiled program, by sending commands to the microprocessor card. The test script is simply a program, potentially a production program, in which certain parameters are set and known so as to define tests.

The debugging instructions are then executed during the execution of the compiled program, and provide to debugging software (which can be different from software containing the test script) appropriate debugging information relating to this execution of the compiled program in a production runtime environment, in this case in the operating system of the microprocessor card.

It is thus possible to compare the results obtained from the debugging instructions with expected results.

The test script is for example in an external appliance provided with a microprocessor card reader and can exchange information in a master-slave mode with the microprocessor card, using conventional protocols, for example according to standard ISO 7816 using APDU commands and responses.

In a normal use configuration of the compiled program ("production conditions"), these exchanges between the test script and the card do not relate to the debugging instructions as the test scripts represent the normal runtime conditions of the compiled program and therefore access the compiled program in the microprocessor card only in order to perform therein the primary operation of the compiled program, although optionally with some predefined test parameters.

As the debugging instructions increase the size of the compiled program, care will be taken to restrict their number and to place them in a considered manner according to the algorithmic sequences of the program, so as to comply with the limited resources of the microprocessor cards (for example the ROM capacity).

Apart from the increase in the size of the compiled code, these debugging instructions introduce an increase in the runtime of the compiled program.

Thus, under some operating conditions, the debugging instructions could be deactivated so that they are not executed during the execution of the compiled program containing them. This makes it possible to reduce the runtime of the compiled program during its production use.

As the test scripts represent normal runtime conditions of the program, the (ADPU type) exchanges with the microprocessor card are not designed to supply to the card reader (where the test user has access) the results of executing the debugging instructions.

Moreover, if it were necessary to retrieve them using APDU commands, numerous and complex adaptations would be required to ensure that an APDU command was generated at each debugging instruction in order to retrieve the result from it. These adaptations cannot be envisaged.

Provision is thus made to use another communication channel (different from the master-slave relationship of the APDU commands) created and used on the microprocessor card's initiative (no longer by a card reader), in order to communicate the results of executing the debugging instructions.

These two communication channels are of a different type (therefore logically different), but can also in addition be physically different, for example via two different physical connections between the card and the card reader. In this way it is ensured that the configuration in which the compiled program is executed conforms as closely as possible to the production configuration.

The invention will now be illustrated with reference to various embodiments of debugging systems.

FIG. 1 shows a debugging system using a conventional ISO 7816 connection, over which APDU message exchanges are implemented.

This connection has the drawback that it only allows one communication at a time, i.e. a single communication channel at any given time. For this reason, the embodiment corresponding to this figure is hereinafter called the "deferred mode", in that the results of the debugging instructions (the channel initiated by the card) cannot be transmitted at the same time as the test script exchange (the master-slave channel) with the card for executing the compiled program. These results will therefore be transmitted over the ISO 7816 link successively, when the use of the first communication channel has ended (i.e. generally after the test scrip has been executed).

For this reason, this embodiment does not, strictly speaking, provide the debugging information in real time. It is however retained here to illustrate the following embodiment, corresponding to an embodiment of the invention.

Figure 4:
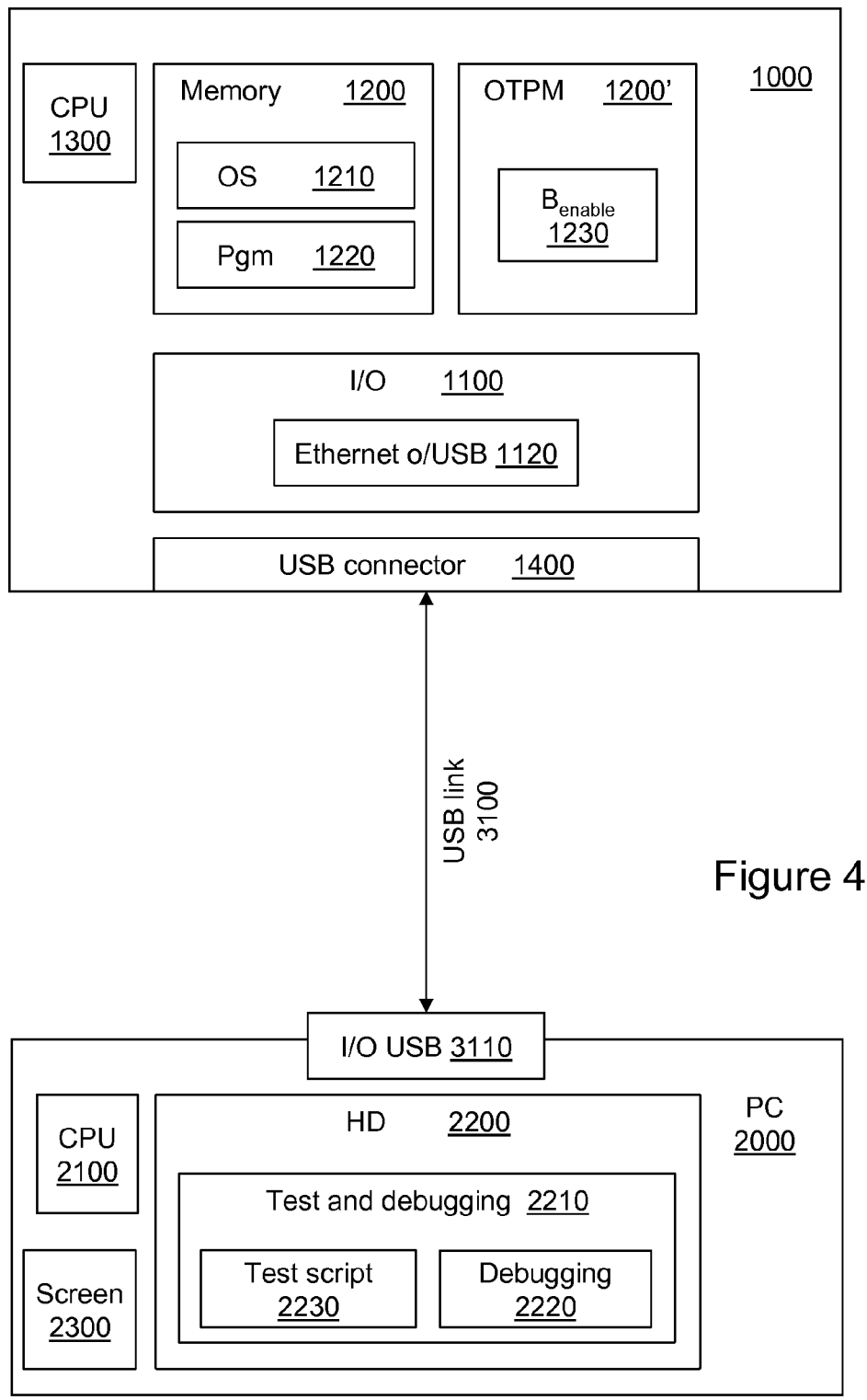
FIG. 4 shows a debugging system in "real-time" mode according to the invention, using a USB connection.

FIG. 4 shows an equivalent debugging system that in contrast uses a connection authorizing several simultaneous communications, for example a USB connection.

It is now established that some microcontroller cards have a USB interface allowing several parallel communications between the card reader and this card.

The embodiment of the invention corresponding to this figure is hereinafter called the "real-time mode" in that the results of the debugging instructions can be directly transmitted to the external entity as soon as these instructions are executed. The exchanges with the test script (the master-slave channel) and transmission of the results of the debugging instructions (the channel initiated by the card) can then be simultaneous over a single USB physical link between the microprocessor card and the card reader.

Of course, other configurations can be envisaged. For example, if the microprocessor card has two communication interfaces (therefore two physical links, for example one by contact via ISO 7816 or USB with the external entity holding the test script, and the other contactless, for example ISO 14443, with the external entity, identical or different, holding debugging software; also for example one via certain electrical contacts of an ISO 7816 physical interface and the other via alternative contacts of this same physical interface), the two communication channels can be simultaneous over the two corresponding different physical links.

Figure 6:
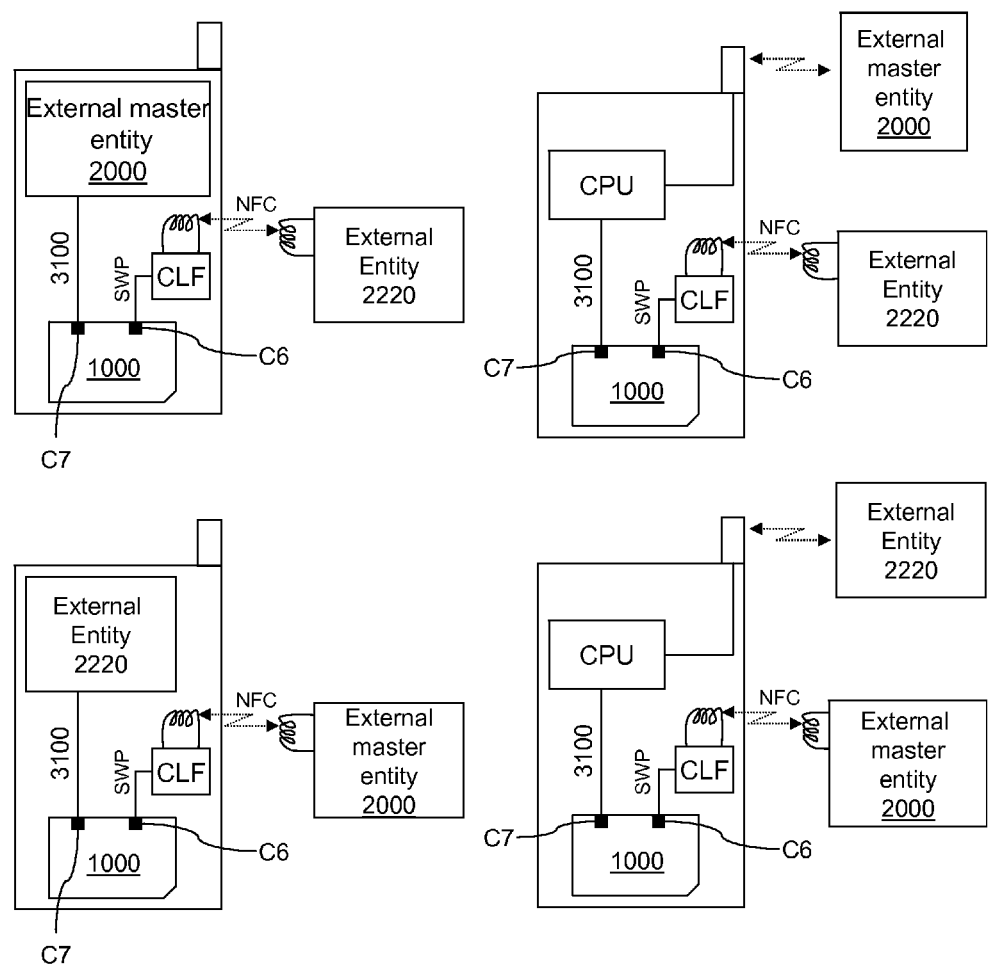
FIG. 6 shows a configuration of implementation of the invention for a hardware security module integrated into a mobile phone provided with a contactless communication interface of the NFC type.

Also, as shown in FIG. 6, the microprocessor card, for example a contact SIM card or any integrated circuit, can form part of a host appliance such as a mobile phone or smartphone. This host appliance is provided with an NFC-type contactless CLF ("ContactLess Frontend") circuit, connected to the C6 electrical contact of the SIM card. The latter communicates with the CLF circuit using the SWP protocol ("Single Wire Protocol"), allowing contactless communication with an external entity via the CLF circuit (or, in a variant, with the computer 2000 described below).

In this configuration, one of the communication channels (master-slave channel or channel initiated by the card) is implemented over this contactless communication interface (C6-SWP-CLF-NFC contact) and the other communication channel can be implemented using the conventional ISO 7816 protocol at the contact C7 (I/O). Preferably, the contactless NFC communication is initiated by the SIM card.

The different configurations shown in this figure differ according to the use of one or other of these channels for communicating either with the external entity or with the master computer 2000, and also according to the implementation of the external entity or master computer 2000 (as applicable) within the mobile phone itself or by an external appliance with which the mobile phone communicates via conventional mobile communications means.

With reference to FIG. 1 describing the "deferred mode" a card 1000 having a microprocessor 1300 also comprises a memory 1200, for example EEPROM, an I/O communication module 1100 and a physical connection interface 1400 allowing the module 1100 to communicate externally. The card 1000 can be a hardware security module allowing confidential data to be protected, for example using authentication and/or encryption procedures.

The communication module 1100 is shown here by an ISO 7816 communication module (reference 1110) allowing communication with an external reader via APDU messages. Of course, other communication protocols (with or without contact, USB, etc.) can be envisaged in the "deferred mode" described here. The connection interface 1400 can be contact or contactless according to the hypothetical case envisaged.

The memory 1200 here comprises an operating system OS 1210, the execution of which by the microprocessor 1300 defines a runtime context for other applications or programs. It also comprises the compiled program 1220 including debugging instructions ID, subject of the debugging according to the invention, as well as a means 1230 of activation or inhibition of the debugging instructions and a debugging file 1240.

It should be noted that the compiled program 1220 to be tested and debugged comprises a set of instructions I which carry out one or more operations OP and define the primary function of the production program, and comprises one or more debugging instructions ID introduced within the instructions I. The debugging instructions ID have no impact on the implementation of the program function, i.e. whether or not they are executed during the execution of the compiled program has no effect on the execution of the instructions I and thus on the result of the program expected by the application calling it.

In a particular example, the compiled program can be directly the operating system OS 1210, in which case the following explanations will be adapted to the compiled program OS 1210. The runtime environment is then constituted by the hardware components of the card and their drivers.

The means 1230 can simply take the form of a device having two states '0' or '1', for example via a $B_{enable}$ bit (or flag) in the memory: $B_{enable}=1$ corresponds to activated debugging instructions as described below (called the "active" state), and $B_{enable}=0$ to deactivated instructions (called the "inhibition" state). The means 1230 can however adopt more complex forms, such as for example a stateful machine.

A central bus (not shown) links the different electronic components of the previously-described card 1000, as well as a RAM memory (not shown) into which are loaded the instructions of the compiled program 1220 and those of the OS 1210 so that they can be executed by the microprocessor 1300 when the card 1000 receives an electricity supply.

A card reader 3010, here of the type ISO to allow the exchange of information with the communication module 1110 according to the ISO 7816 standard, is provided for receiving the card 1000. In the figure, the connecting physical link between the card 1000 and the card reader 3010 is shown by the reference 3000. It should be noted that in some embodiments, this physical link can correspond to a contactless ISO 14443 communication.

This card reader 3010 forms part of or is connected to a test and debugging appliance, here simply a personal computer PC 2000.

This computer 2000 is of a conventional type and comprises, for the purposes of illustrating the invention, a CPU processor 2100, a display screen 2300 and a memory 2200, of the hard disk (HD) type, containing a test and debugging application 2210, containing in particular a test script 2230 and a program 2220 for reading the debugging file also called "debugging software".

The test script 2230 can consist of an ISO 7816 command sequence (APDU commands) intended to automatically execute and drive the compiled program 1220, and also other functions of the card 1000 (for example operating system (OS) commands).

The reader program 2220 is itself configured to read a debugging file such as the file 1240 and to display the debugging information to a test user via the screen 2300. The reader program 2220 can be launched automatically at the end of execution of the test script 2230, to transfer the debugging file 1240 so that it can be read and displayed.

In a variant, an action by the test user can be required.

Moreover, the test script 2230 and the reader program 2220 can be two independent applications, i.e. not belonging to a single test and debugging application 2210.

Figure 2:
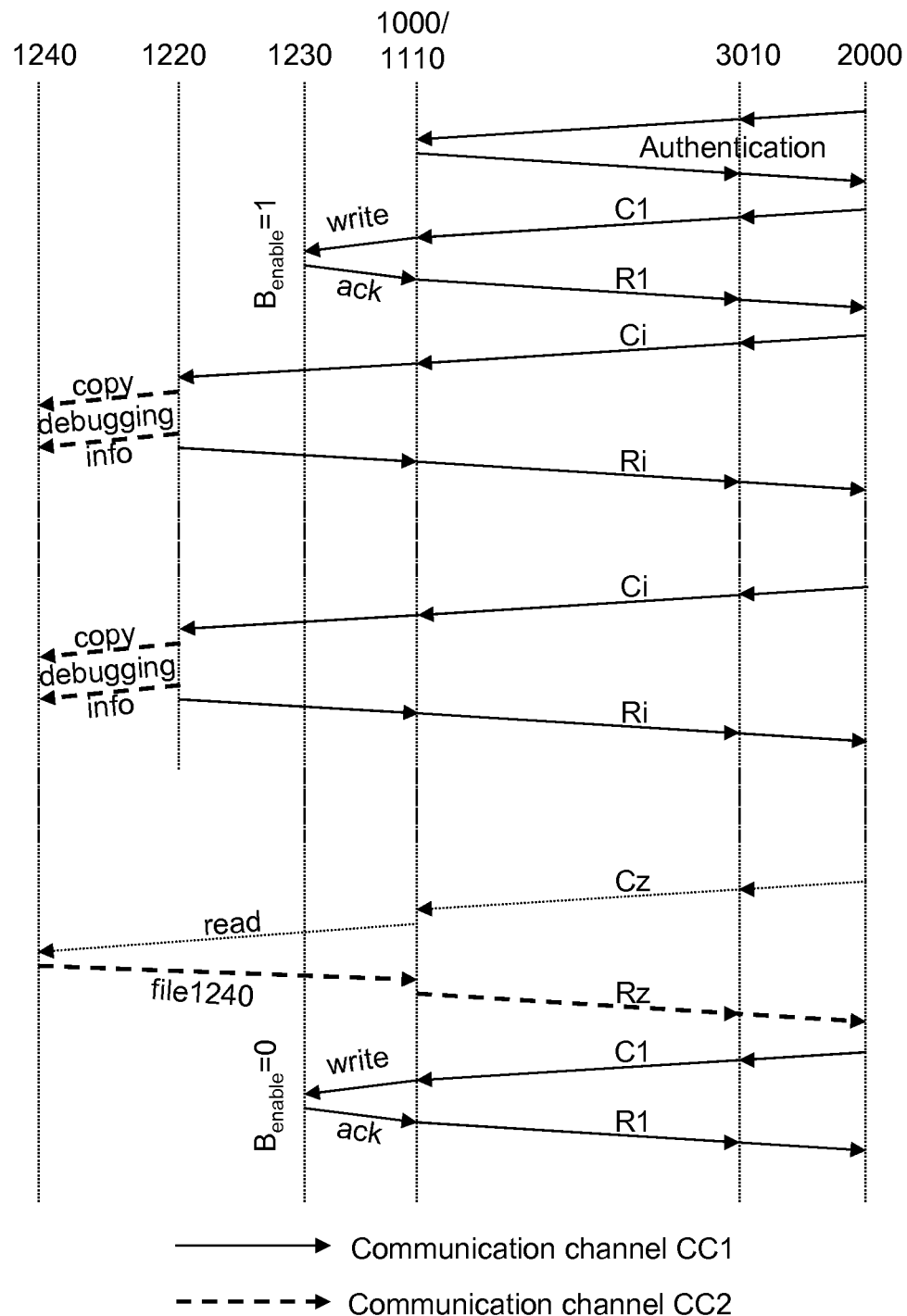
FIG. 2 shows data exchanges between the microprocessor card and a test appliance, in the deferred mode of FIG. 1.

The debugging process at the request of the test user will now be described with reference to FIG. 2. In this figure, the tips of the arrows denote the elements involved either in the relaying or in the processing of a transmitted message.

The user launches the application 2210. As it is a test and debugging application, the programs to be tested in the card 1000 must execute the debugging instructions ID that they contain.

To this end, the application 2210 initiates the execution of a test script 2230 which sends a first ADPU command C1, via the ISO reader 3010, to the card 1000 to activate the debugging instructions ID. This command is transmitted in a first communication channel initiated by the PC 2000 associated with a reader 3010.

In a variant this command C1 can be sent by the test application 2210 before launching the test script 2230.

The effect of the command C1 is to make the two-state device 1230 change to the active state: $B_{enable}=1$. For the purposes of illustration, this command C1 can be a simple write request of the $B_{enable}$ bit with the value 1.

It should be noted that for security reasons, such a command can require prior authentication of the test user (i.e. of the computer 2000) in the card 1000, by conventional mechanisms. Thus, the card 1000 will only be authorized to execute the command C1 if the authentication has been successful.

After acknowledgment R1 of this command, the card 1000 is ready for the debugging of the compiled program 1220.

The rest of the test script 2230 is run and has the effect of sending a predefined sequence of APDU commands Ci, activating and driving the execution of the compiled program 1220 according to any predefined test parameters.

These commands Ci reproduce a possible behaviour of an operation of the compiled program 1220 used in its production configuration. In other words, these commands only process the primary function or operation OP implemented by the compiled program 1220, and not the debugging instructions ID.

When received by the card 1000, these commands Ci are processed by executing the compiled program 1220 and generate APDU responses Ri.

The commands C1, Ci and responses R1, Ri are exchanged between the compiled program 1220 and the test application 2210, within the (master-slave) communication channel CC1 between these two software components and initiated by the PC 2000 or reader 3010. This first channel CC1 takes in particular the link 3000.

During the execution of the compiled program 1220, the debugging instructions ID are executed as a result of the active state $B_{enable}=1$ of the means 1230.

The debugging instructions ID comprise processing that does not modify the execution of the instructions I, for example this can involve retrieving a copy of values of internal variables and/or of the current runtime stack storing current instructions and values.

These items of retrieved information, or "items of debugging information", are copied to the debugging file 1240. The debugging file 1240 can in particular be implemented in the form of a circular list, optionally concatenated and/or having inputs of limited length, to limit the size of the items of debugging information in the memory of the card 1000. This configuration is particularly advantageous for microprocessor cards provided with limited memory resources. Of course other embodiments, such as a linear file or a table, can be envisaged.

The copy function in particular is provided within the debugging instructions ID themselves.

Once the execution of the test script 2230 is complete, the reader program 2220 can be launched, while the ISO communication link 3000 is free from that moment, released from the APDU communications Ci/Ri.

The reader program 2220 then sends a new APDU command Cz, automatically or on instruction from the test user, for the purpose of obtaining a copy of the debugging file 1240. For the purposes of illustration, this command Cz can be a simple request to read this file 1240.

The file 1240 is obtained by the operating system OS of the card 1000 reading the memory 1200. The debugging file 1240 is consequently sent (response Rz) to the reader program 2220, via the ISO link 3000.

As is apparent from the above, this embodiment uses a deferred communication of the items of debugging information by temporarily storing them in the debugging file 1240.

In this example, the communications are implemented successively over a single physical link 3000 linking the card 1000 with the card reader 3010 and the computer 2000.

It should be noted that in a security embodiment, the debugging file 1240 and therefore the items of debugging information that it contains can be encrypted before leaving the card 1000 for transmission over the link 3000.

The items of debugging information thus retrieved by the reader program 2220 are used locally in order to deduce therefrom any malfunctions and bugs of the compiled program for the purpose of correcting them. By way of example, this use can consist of displaying the items of debugging information (the value of the internal variables or of the runtime stack) to the user via the display unit 2300.

Execution of the test script 2230, the reader program 2220 or the test application 2210 can be terminated by sending a new command (similar to the command C1) to switch the two-state device 1230 to the inhibition state $B_{enable}=0$. Thus, if the compiled program 1220 is called again for a use other than a test and debugging, its execution will not be extended owing to the debugging instructions ID.

FIG. 3 shows a simplified example of a compiled program (in its source version) including debugging instructions ID.

This example concerns a function called "inspectedFunction" comprising instructions I for carrying out a primary function of the program (not made explicit in lines 14 and 21 for example) and debugging instructions ID1 to ID6.

In this example, the debugging instructions are intended to warn of the success or failure of the function called function_a( ), and if applicable to pop the value of the local variables var_a, var_b and var_c (ID5 in line 29). The instructions ID1, ID2, ID3, ID4 and ID6 provide, within the items of debugging information, an indication of the progress of the processing of the inspectedFunction.

It will be noted in this example that the inhibition or activation of the debugging instructions ID is implemented using conditional instructions on the basis of the $B_{enable}$ bit. Line 2 of the UDEBUGF function called by the instructions ID1-1D6 makes the debugging processing conditional on the presence of $B_{enable}=1$. Thus, in the absence of activation of the debugging instructions, the instruction UDEBUGF simply returns to the routine which called it, in this case to the inspectedFunction, at the current point.

It should be noted that the character strings passed within the parameters of this function are copied within the UDEBUGF function (line 3), into the file 1240.

Of course, other embodiments than the conditional instruction can be envisaged.

Referring now to FIG. 4 describing a "real-time mode" according to the invention, the card 1000 is similar to the card of FIG. 1, with the exception that it has a USB connection 3100 with a USB input/output interface 3110 on the computer 2000.

To this end, the card 1000 comprises an Ethernet-over-USB type communication module 1120 (instead of the ISO 7816 module referenced 1110 in FIG. 1) making it possible in particular to include a web server in the card 1000.

It should be noted that such web servers are currently created using the Java standard, for example Javacard 3.0.

Such a communication module is thus configured to create TCP or UDP sockets with a remote entity provided with an Ethernet or IP address.

Moreover, the two-state means 1230 is implemented in an OTPM ("One-Time Programmable Memory") 1200'. As a result, the means 1230 are in the active state ($B_{enable}=1$) by default. Of course this embodiment of the means 1230 described in connection with FIG. 4 can be implemented in the indirect mode of FIG. 1. Conversely, the embodiment of the means 1230 previously described in the indirect mode can be implemented in the present direct mode.

By the very nature of the OTPM memory, a command inhibiting the debugging instructions ID (a command C16 writing $B_{enable}=0$) definitively deactivates these instructions as the $B_{enable}$ bit can no longer return to the state 1. This configuration has a certain advantage in that it ensures that the secret items of information in the card can no longer be accessible to a malicious person, via the debugging mechanisms.

Thus this embodiment is mainly envisaged when tests must be carried out immediately after compilation of the program 1220, and when it is intended to make this program available for production as soon as the tests are complete. Definitive inhibition of the debugging instructions ID on demand thus takes place at the end of the tests using a simple command C1 (optionally secured by authentication).

Of course, other embodiments are possible such as for example decompiling the means 1230 into the combination of a first $B1_{enable}$ bit in the rewritable ROM memory to activate or deactivate the debugging instructions ID during a test phase, and a second $B2_{enable}$ bit in the OTPM memory to envisage the definitive deactivation of the instructions ID if necessary.

Use of the OTPM memory alone thus requires the test and debugging application 2210 not to systematically send the commands C1 previously described in connection with FIG. 1. Only one such command will be sent (once only) when the tests are definitively terminated.

Figure 5:
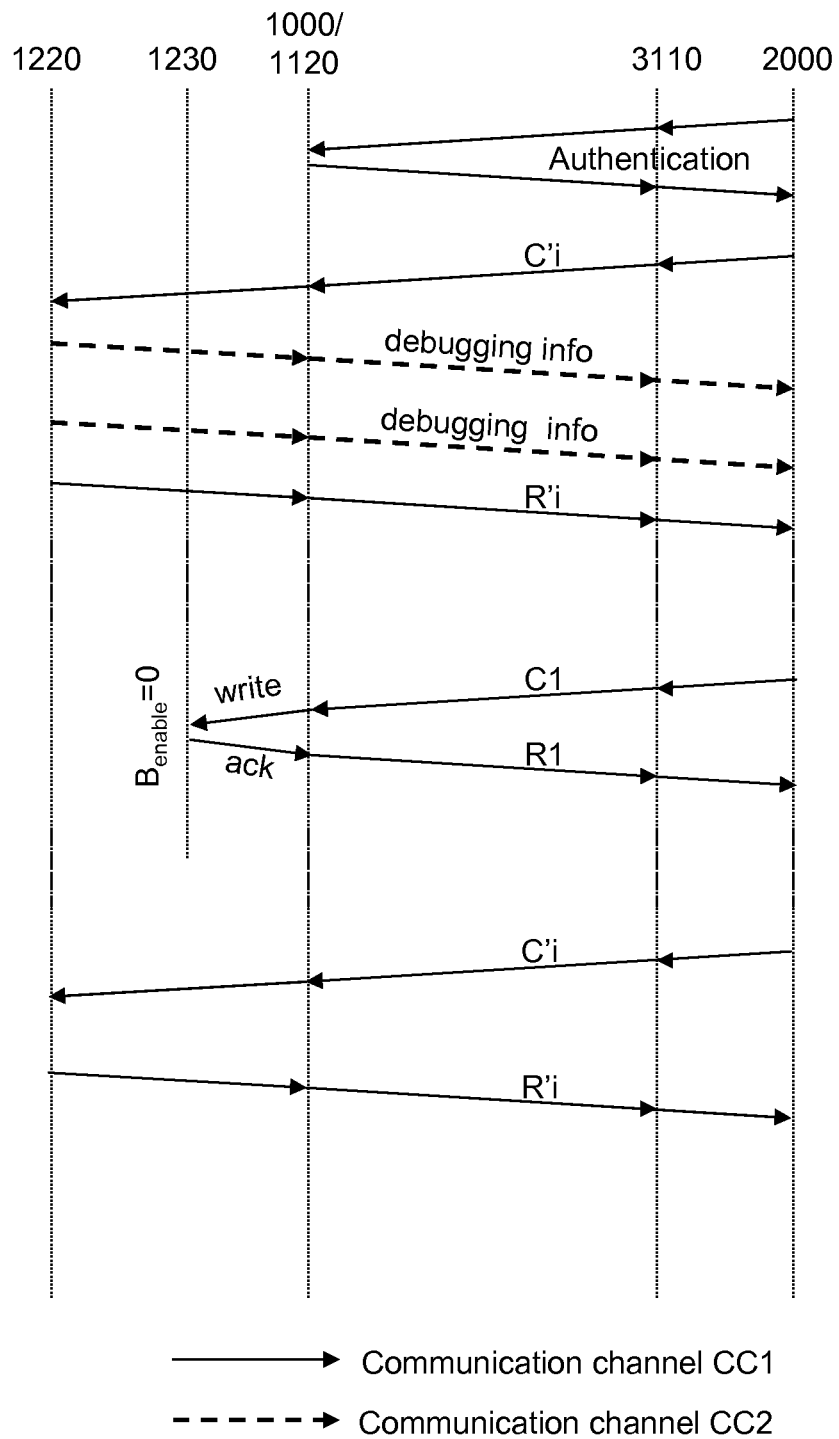
FIG. 5 shows data exchanges between the microprocessor card and a test appliance, in the real-time mode of FIG. 4.

FIG. 5 shows the data exchanges in the "real-time" mode according to the invention. In this figure, the tips of the arrows denote the elements involved in either the relaying or the processing of a transmitted message.

After optional conventional authentication to authorize or not authorize the card 1000 to execute any command sent by the computer 2000, the test script 2230 sends a sequence of commands C'i via the USB connection 3100, over the master-slave channel CC1. Here, these commands can be included in http requests to the web server provided in the card 1000.

These commands C'i (only one is shown in the figure) launch and drive the execution of the compiled program 1220.

Like $B_{enable}=1$, the debugging instructions ID are executed during the execution of the compiled program.

These executions of the instructions ID make it possible to retrieve items of debugging information, to create, according to conventional mechanisms, a UDP socket via the USB connection 3100 with the debugging software 2220, and to send these items of debugging information (in one or more than one go) to the debugging software 2220 via this socket. It should be noted that this socket can be created on powering up the card before the compiled program has been executed.

This sending is shown in the figure by the bold broken line corresponding to the channel CC2 initiated by the card and not the reader.

It should be noted that the Ethernet address of the debugging software (given in the transmitted UDP packets) is in the memory of the card 1000, for example stored after transmission by the test application 2210 at the start of its execution.

It is then possible for the items of debugging information to be used by the debugging software 2220 as described above for the deferred mode. Moreover, given the Ethernet formatting of the items of debugging information for their transport via the UDP socket, it is easy to relay these data to a third-party appliance remote from the computer 2000 via a communications network, for example the internet.

At the end of the execution of each command Ci by the card, a response R'i is sent to the test application 2210.

The term "real-time mode" is used because the items of debugging information are sent immediately on execution of the instructions ID, even if the execution of the compiled program 1220 has not been terminated. The two channels CC1 and CC2 can therefore be simultaneous over a single USB connection.

Subsequently, when the tests and debugging have been terminated, a command C1 can be transmitted to the card to deactivate the debugging instructions ID (optionally definitively). This makes it possible on the one hand to obtain the compiled program 1220 in its production version without its execution being extended by that of the instructions ID, and on the other hand to prevent any prohibited access to secret data which would have been sent via the items of debugging information, since such information is no longer produced.

This command C1 leads to writing $B_{enable}=0$ to the OTPM memory 1200' and to its acknowledgement R1.

As shown in the figure, from now on, if new commands C'i are transmitted, only the responses R'i will be sent to the computer 2000, and not items of debugging information.

This real-time mode can also be implemented in the hardware configuration shown in FIG. 6, since in this case the two communication channels are physically different.

The example of FIG. 3 is also applicable to the direct or real-time mode. In this case, the UDEBUGF function comprises, instead of instructions for copying the items of debugging information to the file 1240, instructions for writing the items of debugging information at the UDP socket and thus transmitting them to the reader program 2220.

The above examples are merely embodiments of the invention, which is not limited thereto, for debugging purposes.

In particular, the microprocessor card 1000 can have a first physical connection 3000, for example ISO 7816, with a first reader 3010 and a second physical connection 3100, for example USB, with a USB interface 3110 (both capable of being connected to a single computer 2000 containing the test application 2210). The two channels CC1 and CC2 can then each be implemented on respectively one of the two different physical connections.

Moreover, according to the nature of the physical connections, it is possible to implement at will the real-time mode or the deferred mode that are described above. This is the case with USB connections for example. This is also the case for a microprocessor card having two different physical connections.

In this case, the means 1230 of activation or inhibition can have more than two states: a first state $B_{enable}=0$ corresponding to the deactivation of the instructions ID as described previously, a second state $B_{enable}=1$ corresponding to the activation of the instructions ID in an indirect mode (use of the debugging file 1240), and a third state $B_{enable}=2$ corresponding to the activation of the instructions ID in a real-time mode (UDP socket), for example.

The choice between the second state and the third state (the two active states $B_{enable}\neq 0$) can be driven by the user or determined automatically according to the available connections and their use condition, with for example a preference for the real-time mode when both modes are available.

Moreover, several inhibition or activation means can coexist within the same hardware security module, it being possible to associate a means with a given compiled program, or with a type of debugging instruction within one or more compiled programs containing several of these types of instruction. A person skilled in the art will have no difficulty in adjusting the above-described teachings in the event of several inhibition or activation means being present.

It should be noted finally that the UDP protocol can equally well be implemented over connections with the USB, Bluetooth, ISO 7816 (part 1, defining the physical characteristics) and ISO 14443 (also part 1) physical layer protocols.

The present invention also has other uses, for example for access to data stored by the microprocessor card, for example a large encrypted file.

In such a use, the external entity 2000 seeks to access the content of this encrypted file and to this end sends an APDU access (read) command to the card 1000.

The receipt of this command initiates the execution of decrypting the requested file, followed by transmission of the corresponding decrypted data over a UDP socket previously created by the card 1000.

Thus these decrypted data are not sent in an APDU response the size of which can be limited by standards ISO 7816 or ISO 14443.

The decision to transmit over the UDP socket rather than using an APDU response can depend on local processing at the card for the purpose of determining the size of the encrypted file (or of the decrypted data) in relation to a threshold value (as a function of the limits of standard ISO 7816 for example).

In a variant, the card 1000 can be configured to systematically transmit decrypted data over the communication channel that it initiates (the UDP socket).

In a further variant, a stateful machine (similar to the $B_{enable}$ bit above) can be provided to activate or inhibit (optionally definitively) this access function via the UDP socket.

It should be noted finally that the teachings given above for the debugging and relating to the nature and number of links between the card 1000 and the external entity 2000 are also applicable to access to an encrypted file (and to any stored data of the card): USB, ISO 7816, ISO 14443, SWP, NFC, Bluetooth, a physical link, several parallel physical links, etc.

The above examples are merely embodiments of the invention, which is not limited thereto.

The invention claimed is:

1. A hardware security module, comprising:
   a microprocessor and a program encoded on a non-transitory medium readable by said microprocessor that, upon execution by said microprocessor, causes said microprocessor to carry out an operation,
   wherein the hardware security module is configured, according to a master-slave mode of communication with an external master entity over a first communication channel, to receive a command to execute the program thereby to carry out the operation and to transmit a corresponding response,
   wherein the program is a compiled program comprising code that is executable by the microprocessor, said code including at least one debugging instruction,
   wherein, whether or not said at least one debugging instruction is executed, said at least one debugging instruction does not modify the carrying out of said operation when the program is executed, the debugging instruction provided for debugging the code that forms the program, and
   wherein the hardware security module is configured to:
   in response to receipt of the received command to execute the program, execute the program and thereby generate debugging data resulting from execution of the at least one debugging instruction incorporated within the program, and
   transmit, during the execution of the compiled program, said generated debugging data to an external entity over a second communication channel, said second communication channel being initiated by the hardware security module.

2. The hardware security module according to claim 1, wherein communications over the first communication channel and communications over the second communication channel respectively take place over two different physical links to an outside the hardware security module.

3. The hardware security module according to claim 1, wherein communications over the first communication channel and communications over the second communication channel take place over a single physical link.

4. The hardware security module according to claim 1, wherein the at least one debugging instruction implements a command to write the generated debugging data over a UDP socket created by the hardware security module.

5. The hardware security module according to claim 1, further comprising:
  a means of inhibition or activation of the debugging instruction during the execution of the compiled program.

6. The hardware security module according to claim 5, wherein said inhibition or activation means comprises an item of information stored in a one-time programmable memory so that inhibition of the debugging instruction is definitive.

7. The hardware security module according to claim 1,
  wherein the command received from the external master entity is an access command to an encrypted file stored in the memory of said hardware security module, and
  wherein the generated data transmitted over the second communication channel are decrypted data of said file.

8. The hardware security module according to claim 1, wherein the generated debugging data is transmitted via a UDP socket created at the hardware security module to communicate with the external entity.

9. A mobile phone comprising a contactless communication interface and a hardware security module according to claim 1,
  wherein the hardware security module further comprises a first electrical contact linked to said contactless communication interface, and
  wherein one of the first and second communication channels is compliant with a contactless communication standard via the first electrical contact, and the other of the first and second communication channels is compliant with a contact communication standard via a second electrical contact of the hardware security module.

10. A processing method in a hardware security module comprising a microprocessor and a program encoded on a non-transitory medium readable by said microprocessor that, upon execution by said microprocessor, causes said microprocessor to carry out an operation, the hardware security module being configured to communicate with an external master entity according to a master-slave mode of communication, and the program being a compiled program comprising code that is executable by the microprocessor, said code including at least one debugging instruction, comprising:
  at the hardware security module, receiving, over a first communication channel, a command to execute the program thereby to carry out the operation;
  at the hardware security module, transmitting, over the first communication channel, a response corresponding to the received command;
  at the hardware security module, in response to the receipt of the received command to execute the program, executing the program and thereby generating debugging data resulting from execution of the at least one debugging instruction incorporated within the program; and
  at the hardware security module, transmitting, during the execution of the compiled program, said generated debugging data to an external entity over a second communication channel, said second communication channel being initiated by the hardware security module,
  wherein, whether or not said at least one debugging instruction is executed, said at least one debugging instruction does not modify the carrying out of said operation when the program is executed, the debugging instruction configured for debugging the code that forms the program.

11. The processing method according to claim 10, wherein communications over the first communication channel and communications over the second communication channel respectively take place over two different physical links to outside the hardware security module.

12. The processing method according to claim 10, wherein communications over the first communication channel and communications over the second communication channel take place over a single physical link.

13. The processing method according to claim 10, further comprising:
  at the hardware security module, creating, a UDP socket for communicating over a communication link with the external entity,
  the generated debugging data being transmitted over said UDP socket.

* * * * *